United States Patent
Vucajnk et al.

(10) Patent No.: US 11,792,288 B2
(45) Date of Patent: Oct. 17, 2023

(54) WIRELESS NETWORK DEVICE WITH DIRECTIONAL COMMUNICATION FUNCTIONALITY

(71) Applicant: Extreme Networks, Inc., San Jose, CA (US)

(72) Inventors: Gregor Vucajnk, Fremont, CA (US); Shyamsundar Pullela, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 17/014,658

(22) Filed: Sep. 8, 2020

(65) Prior Publication Data

US 2021/0075878 A1    Mar. 11, 2021

Related U.S. Application Data

(60) Provisional application No. 62/897,604, filed on Sep. 9, 2019.

(51) Int. Cl.
| | | |
|---|---|---|
| *H04L 67/563* | (2022.01) | |
| *H04W 8/24* | (2009.01) | |
| *H04W 12/06* | (2021.01) | |
| *H04W 80/06* | (2009.01) | |
| *H04W 88/16* | (2009.01) | |
| *H04L 67/56* | (2022.01) | |
| *H04L 41/0654* | (2022.01) | |
| *H04L 9/40* | (2022.01) | |

(52) U.S. Cl.
CPC ............ *H04L 67/563* (2022.05); *H04W 8/24* (2013.01); *H04W 12/06* (2013.01); *H04W 80/06* (2013.01); *H04W 88/16* (2013.01)

(58) Field of Classification Search
CPC ....... H04L 67/2814; H04L 67/28; H04L 9/32; H04W 8/24; H04W 8/22; H04W 8/245; H04W 12/06; H04W 80/06
See application file for complete search history.

(56) References Cited

U.S. PATENT DOCUMENTS

| | | | | |
|---|---|---|---|---|
| 6,636,894 B1 * | 10/2003 | Short | .................. | H04L 12/2856 |
| | | | | 709/225 |
| 7,340,525 B1 * | 3/2008 | Bhatia | ................. | H04L 63/0815 |
| | | | | 709/229 |
| 7,958,550 B2 * | 6/2011 | Fenton | ................ | H04L 63/0272 |
| | | | | 726/12 |

(Continued)

*Primary Examiner* — Jenee Holland
(74) *Attorney, Agent, or Firm* — Sterne, Kessler, Goldstein & Fox P.L.L.C.

(57) ABSTRACT

Methods, systems, and devices are provided herein for establishing a proxy communication link for network devices. The proxy communication link can allow a network device, such as an access point, to communicate with a network device manager when the network device is in an error state. A proxy device, such as a smart phone, can be authenticated with the network device manager to provide a communication link and can communicate with the network device using an optical communication system. The proxy device can act as a relay between the network device and network device manager to allow the network device manager to diagnose the error state. Instructions can be sent to the network device or the proxy device to address the error state.

20 Claims, 4 Drawing Sheets

(56) References Cited

U.S. PATENT DOCUMENTS

| | | | | |
|---|---|---|---|---|
| 8,125,999 | B2* | 2/2012 | Yasrebi | H04L 61/5076 709/223 |
| 8,356,171 | B2* | 1/2013 | Shatzkamer | H04L 63/08 713/193 |
| 9,455,972 | B1* | 9/2016 | Dotan | H04W 12/35 |
| 9,594,621 | B1* | 3/2017 | Navilappa | H04L 41/0233 |
| 10,009,980 | B2* | 6/2018 | Harbers | H04L 12/283 |
| 10,098,201 | B1* | 10/2018 | Wilson | F21V 23/02 |
| 10,326,710 | B1* | 6/2019 | Hashmi | H04L 45/74 |
| 2002/0157019 | A1* | 10/2002 | Kadyk | H04L 63/0823 726/4 |
| 2003/0038805 | A1* | 2/2003 | Wong | A63F 13/12 345/473 |
| 2004/0212493 | A1* | 10/2004 | Stilp | G08B 25/10 340/541 |
| 2004/0212494 | A1* | 10/2004 | Stilp | G06K 7/0008 340/539.1 |
| 2005/0027818 | A1* | 2/2005 | Friedman | H04L 67/303 709/217 |
| 2005/0089052 | A1* | 4/2005 | Chen | H04M 1/2535 370/329 |
| 2005/0111435 | A1* | 5/2005 | Yang | H04L 65/1036 370/352 |
| 2005/0135811 | A1* | 6/2005 | Lee | H04B 10/1125 398/139 |
| 2006/0007897 | A1* | 1/2006 | Ishii | H04L 63/0823 370/395.2 |
| 2006/0018328 | A1* | 1/2006 | Mody | H04L 12/2801 370/463 |
| 2006/0193270 | A1* | 8/2006 | Gehasie | H04B 11/00 370/282 |
| 2008/0052508 | A1* | 2/2008 | Huotari | H04L 63/0272 713/153 |
| 2008/0159125 | A1* | 7/2008 | Ando | H04W 8/12 370/221 |
| 2008/0183862 | A1* | 7/2008 | Kobayashi | H04L 41/0654 709/224 |
| 2008/0320566 | A1* | 12/2008 | Herzog | H04L 63/0884 455/411 |
| 2009/0064346 | A1* | 3/2009 | Larsson | H04W 12/06 726/29 |
| 2009/0245163 | A1* | 10/2009 | Inoue | H04W 24/04 370/315 |
| 2009/0327475 | A1* | 12/2009 | Falk | H04L 63/08 709/224 |
| 2010/0301770 | A1* | 12/2010 | Chemel | H05B 47/155 315/294 |
| 2011/0282997 | A1* | 11/2011 | Prince | H04L 63/1433 709/226 |
| 2011/0299412 | A1* | 12/2011 | Diab | G05B 15/02 370/252 |
| 2012/0069776 | A1* | 3/2012 | Caldwell | H04W 4/02 370/271 |
| 2012/0159576 | A1* | 6/2012 | Wang | H04W 12/069 726/3 |
| 2012/0216034 | A1* | 8/2012 | Chen | H04L 63/0823 713/153 |
| 2013/0120449 | A1* | 5/2013 | Ihara | G02B 27/017 345/633 |
| 2013/0185603 | A1* | 7/2013 | Parra | G06F 11/1446 714/48 |
| 2013/0238540 | A1* | 9/2013 | O'Donoghue | G06F 9/451 706/46 |
| 2014/0115150 | A1* | 4/2014 | Ewanchuk | H04L 67/145 709/224 |
| 2014/0187890 | A1* | 7/2014 | Mensinger | A61B 5/746 600/365 |
| 2014/0188398 | A1* | 7/2014 | Cohen | A61B 5/746 702/19 |
| 2014/0229994 | A1* | 8/2014 | Fell | H04N 21/81 725/54 |
| 2014/0237372 | A1* | 8/2014 | Mraz | H04L 67/125 715/734 |
| 2014/0270170 | A1* | 9/2014 | LaPalme | H04L 63/0428 380/255 |
| 2014/0273958 | A1* | 9/2014 | Messana | H04L 63/0892 455/411 |
| 2014/0361888 | A1* | 12/2014 | Huang | G08B 25/009 340/539.1 |
| 2015/0008842 | A1* | 1/2015 | Harbers | H05B 45/37 315/291 |
| 2015/0215784 | A1* | 7/2015 | Gunasekara | H04L 63/102 455/411 |
| 2016/0315773 | A1* | 10/2016 | Hou | H04L 9/3226 |
| 2017/0013441 | A1* | 1/2017 | Manik | H04L 12/66 |
| 2017/0201528 | A1* | 7/2017 | Kim | G06F 21/74 |
| 2017/0374043 | A1* | 12/2017 | Golshan | H04L 9/3268 |
| 2018/0145771 | A1* | 5/2018 | Melodia | H04B 11/00 |
| 2018/0152579 | A1* | 5/2018 | Iwasa | H04N 1/00891 |
| 2018/0241760 | A1* | 8/2018 | Stephens | H04L 63/0428 |
| 2018/0288614 | A1* | 10/2018 | Zaks | H04L 63/0428 |
| 2018/0302239 | A1* | 10/2018 | Ying | H04L 41/28 |
| 2019/0075099 | A1* | 3/2019 | Brouchier | H04L 63/0853 |
| 2019/0208381 | A1* | 7/2019 | Booij | G01S 1/725 |
| 2019/0273746 | A1* | 9/2019 | Coffing | H04L 67/32 |
| 2019/0297079 | A1* | 9/2019 | Delcourt | H04L 63/123 |
| 2020/0028823 | A1* | 1/2020 | Mukhopadhyay | G06F 21/602 |
| 2020/0177576 | A1* | 6/2020 | Vudathu | H04L 63/0807 |
| 2022/0240214 | A1* | 7/2022 | Mao | H04L 61/4511 |

\* cited by examiner

FIG. 4

WIRELESS NETWORK DEVICE WITH DIRECTIONAL COMMUNICATION FUNCTIONALITY

CROSS-REFERENCE TO RELATED APPLICATIONS

This application claims priority to U.S. Provisional Patent Application Ser. No. 62/897,604, filed Sep. 9, 2019, which is hereby incorporated by reference.

FIELD

This disclosure relates generally to providing proxy communication for network devices using optical communication.

BACKGROUND

With the proliferation of wireless networks, including cloud networking, network devices, such as access points, are being deployed in increasing numbers. Service providers may monitor the devices through the cloud using a monitoring system or network device manager to ensure that a network is operating as expected. However, some of the software or hardware errors that network devices may experience can interrupt service, preventing a service provider from being able to communicate with the network device.

Technicians may be deployed to provide physical access to the network device. This may be accomplished by using a connector that provides a physical interface to the network device. The technician may then attempt to correct the service interruption, either personally or by using the physical interface to provide a functioning connection through the cloud to the monitoring system.

These physical connection points may be problematic due to the placement of the network devices. Network devices are often placed so that they are unseen, including being placed in the ceiling or other out of the way and difficult to reach locations. The technician may have to use a ladder or climb into an awkward position to make the physical connection. The network device may also be installed such that the connector is up against a surface, such as a wall. As a result, the technician may have to remove the network device from its mounting to find the connector.

SUMMARY

Provided herein are system, apparatus, article of manufacture, method and/or computer program product embodiments, and/or combinations and sub-combinations thereof, which provide a proxy connection to a network device, using optical communication.

Systems and methods for repairing a network device using a proxy communication link between a network device and a network device manager may perform operations of authenticating a proxy device by verifying a credential of the proxy device to establish a secure connection between the network device manager and the proxy device. A proxy communication link may be established from the network device manager to the network device via the proxy device based on the secure connection, and a device state of the network device may be transmitted to the network device manager via the proxy communication link. The network device manager may determine repair instructions for the network device based on the device state and transmit the repair instructions from the network device manager via the proxy communication to the network device. The network device may receive and execute the repair instructions on the network device to repair the network device.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method, and/or computer program product embodiments, and/or combinations and sub-combinations thereof, which provide a proxy connection to a network device, using optical communication.

Figure 1:
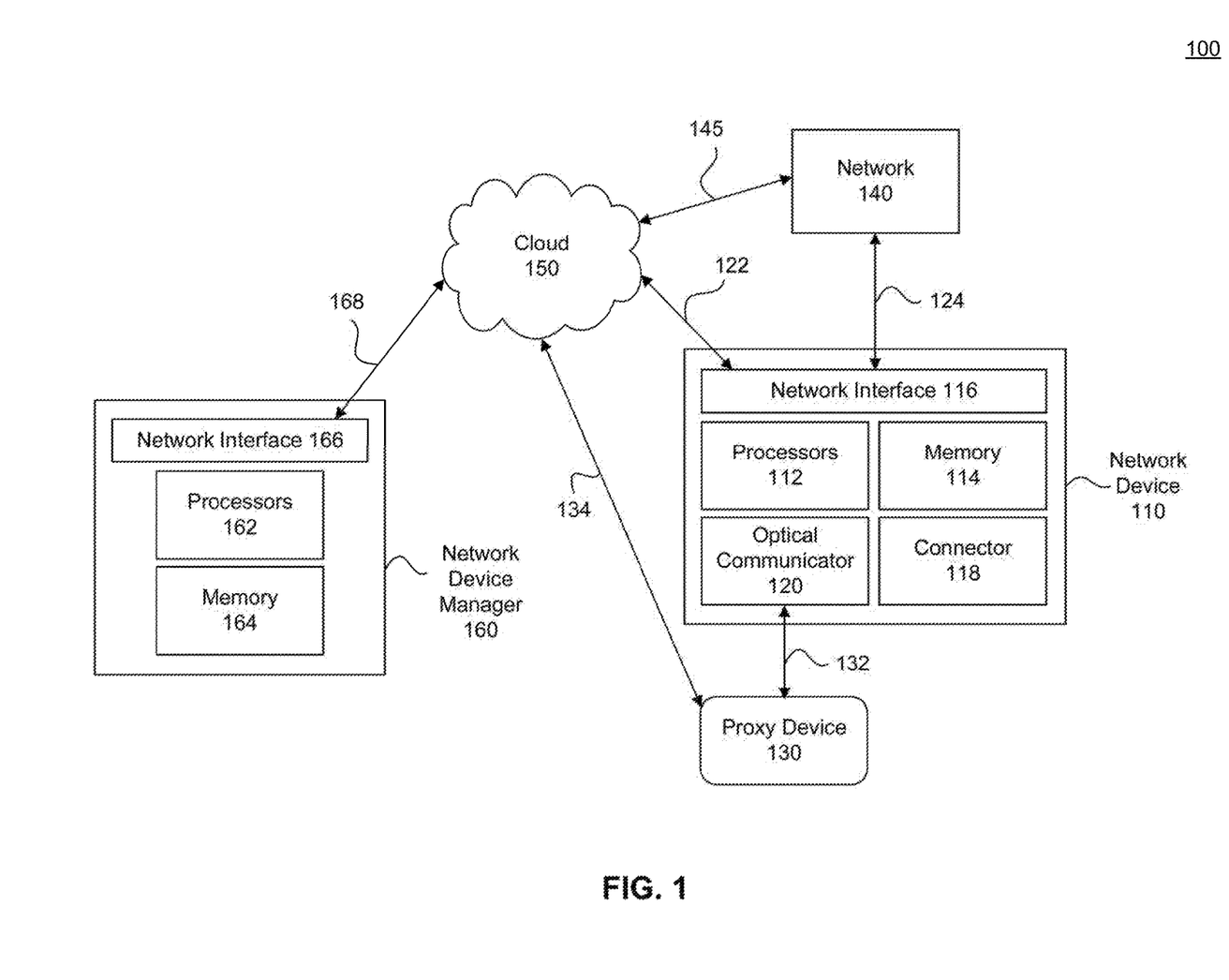
FIG. 1 illustrates a block diagram of a proxy communication system, according to some embodiments.

FIG. 1 depicts a block diagram of a proxy communication system 100, according to some embodiments. The proxy communication system 100 includes a network device 110, a proxy device 130, and a network device manager 160, which can communicate with each other through a cloud 150. The network device 110 can communicate with a network 140, which can communicate with the network device manager 160 through the cloud 150.

The network device 110 can be a router, a switch, an access point, a wireless gateway, a repeater, or a combination thereof. As a gateway, the network device 110 can transport data from a backend of a network to a device coupled to the network device 110. As an access point, the network device 110 (e.g., a user device) accesses the network 140.

In some embodiments, the network device 110 is a wireless access point (WAP). In an 802.11-compliant implementation, a WAP is a networking hardware device that allows a wireless device to connect to a backbone network in compliance with the IEEE 802.11 standard, Bluetooth, or ZigBee.

The network device 110 may include processors 112, a memory 114, a network interface 116, a connector 118, and an optical communicator 120. The memory 114 can store instructions that can be executed by the processors 112 to operate the network device 110. The network interface 116 can allow the network device 110 to communicate with the network 140 through a network connection 124 or with other devices connected to the network (not shown for simplicity). The connector 118 can be a physical connection for coupling the network device 110 to an external device through a cable or connector, such as a pinned receptacle or a universal serial bus (USB) port. The optical communicator 120 can be an optical communication system or a light-emitting diode (LED) configured to communicate with another device, such as the proxy device 130.

In some embodiments, the network device 110 is configured to operate as an independent network entity, performing network functions such as providing network services. The network device 110 can be configured to communicate with the network device manager 160 through the cloud 150, such as through a direct cloud connection 122 and a secure connection 168. These connections can be secure connections that allow the network device manager 160 to monitor the functionality of the network device 110 and perform maintenance on the network device 130.

In some embodiments, the network device 110 is configured to operate as a part of the network 140 and is representative of the many network devices 110 that can be present in the network 140. The network devices 110 can be different types of network devices, as discussed above. The network device 110 can be configured to communicate with the network device manager 160 independent of the network 140, such as through the direct cloud connection 122 and the secure connection 168.

The network device 110 can communicate with the network device manager 160 through the network 140, such as through the network connection 124, the network 140, the cloud connection 145, the cloud 150, and the secure connection 168. These connections can be secure connections that allow the network device manager 160 to monitor the functionality of the network device and perform maintenance on the network device 110 through the network 140.

In some embodiments, the network device 110 can be updated by instructions to operate according to the methods and embodiments described herein. For example, the network device 110 can have stored instructions on a memory 114 that cause it to perform operations for which it is configured, but not to perform operations to establish an optical communication link. The instructions for updating the network device 110 can be provided to and executed by the network device 110 to update the stored instructions on the network device 110. Once updated, the network device 110 can execute the instructions to establish an optical communication link. The instructions for updating the network device 110 can be stored on a non-transitory memory device and provided to the network device 110 through the network 140 or by means of a direct connection, such as a USB connection.

The network 140 can have one or more network devices 110. At least some of the network devices can have directional communication functionality, such as that provided by the optical communicator 120.

The network device manager 160 can include processors 162, a memory 164, and a network interface 166. The memory 164 can store instructions that can be executed by the processors 162 to operate the network device manager 160. The network interface 166 can be configured to allow the network device manager 160 to communicate with other devices or networks in the cloud 150 or connected to the cloud 150, such as the network device 110, the network 140, and/or the proxy device 130.

The cloud 150 can be a network, a communication channel or medium, a group of devices or networks, or other embodiments of a cloud. The network manager 180 can connect to the cloud 150, can be a device or system in the cloud, or can be a cloud device distributed across devices in the cloud 150.

In some embodiments, the network device manager 160 is configured to monitor one or more network devices 110. These network devices 110 can be part of the network 140. Monitoring the network devices 110 can be part of a system for ensuring that the network devices 110 provide the services for which they are designed to devices or networks accessing those services. For example, if the network device 110 is an access point, network device manager 160 can monitor the network services provided to devices connected to the access point.

The network device manager 160 can be configured to update firmware or software of the network device 110. In response to the network device 110 functioning below capacity or being in an error state, the network device manager 160 can send instructions to repair or correct a device state of the network device 110. As part of this operation, the network device manager 160 can request a device state or performance analytics from the network device 110. The device state and performance analytics can be analyzed by the network device manager 160 to determine the issue in the network device 110.

Once the network device manager 160 has determined the issue, the network device manager 160 can send repair instructions to the network device 110 to correct the issue. Repair instructions can be a software or firmware update or a repair to a setting or aspect of the network device 110. The repair instructions can be used to update or modify the device state of the network device 110 or change code or instructions stored on the network device 110.

For example, a fault state can be triggered in the network device 110. In some embodiments, this fault state can prevent the network device 110 from communicating with the network 140. The repair instructions can reset the network device 110 to repair the fault state. The repair instructions can be executed by the processors 112 or the instructions can be in a message format that can be translated by the processors 112 into instructions for the network device 110.

In some error states, the network device 110 can be unable to communicate with the network device manager 160. The network device manager 160 can be configured to notify a user when such an occurrence happens. Such errors can be due to problems in the network 140, the network interface 116, and/or internal issues in the network device 110. Example errors include instances where the network interface 116 failed or a setting in the memory 114 no longer is proper for an environment in which the network device 110 is operating. Other hardware and software errors can occur both in the network device 110 and in the communications link between the network device 110 and the network device manager 160.

As discussed above, in some embodiments, a user can be notified. The user, such as a service technician, can proceed to the location of the network device 110 and diagnose the issue locally. The network device 110 can be accessed by the device (e.g., the proxy device 130), which can include a connector communicatively coupled to the connector 118. This device can operate as a local network device manager to perform similar functionality as the network device manager 160. Alternatively, the device can function as a bridge to the network device manager 160 by providing a communications link.

Due to the placement of the network device or interference from other devices or surfaces, it can be difficult to access the connector 118. This can be in part due to the physical access required to use the connector 118. In some embodiments, a backup short-range wireless communication system, such as Bluetooth or ZigBee, can be used to access the connector 118. In some embodiments, another alternative is to use an optical, or directional, communication system, such as the optical communicator 120. A technician can be provided with a device that communicates according to the communication protocol of the backup short-range wireless communication system and access the network device 110. This allows access to the network device 110 from a distance, avoiding use of ladders or the requirement of proximity.

The method, device, and system embodiments described herein provide an optical communication system. Embodiments of the optical communication system (e.g., the optical communicator 120) can be implemented at an order of magnitude lower cost than other wireless systems, such as Bluetooth- and ZigBee-based systems. In some embodiments, the optical communication system can consume power at least an order of magnitude (e.g., two orders of magnitude) lower than other wireless systems. For an organization with many network devices 110, including access points, the cost and power savings of the optical communication system embodiments described herein can be significant.

Embodiments of the present disclosure disclose a directional communication system, which can offer improved security compared to other implementations. The directional communication system can include a directional communication channel that can be shielded from environmental interference by angling an LED and/or light sensor. Also, when angled appropriately, the optical communication system can have greater range than short-range radio (e.g., Bluetooth radio), can be used as a backup radio when a primary radio is non-functional, and can provide better performance in radio frequency (RF) congested environments.

In some embodiments, the optical communicator 120 can be placed on a surface facing away from a mounting portion of the network device 110. For example, a mounting bracket can be on one side of the network device 110 for mounting the network device 110 on a surface. The optical communicator 120 can be located on a second side of the network device 110 that is opposite the side of the mounting bracket. This can allow the network device 110 to be mounted on a surface while still providing access to the optical communicator.

The optical communicator 120 can be accessed by another device with an optical communication system, such as the proxy device 130 in FIG. 1. The proxy device 130 can provide an optical communication path 132 to the network device 110, such as a key fob or a dongle. In some embodiments, the proxy device 130 is a mobile device, such as a smart phone or tablet, which can use its display or another light source to communicate with the optical communicator 120. The proxy device 130 can run an application configured to communicate with the optical communicator 120.

In some embodiments, the proxy device 130 acts as a proxy between the network device 110 and the network device manager 160. The proxy device 130 can establish and provide an optical communication link to the network device 110 through an optical communication path 132 and a secure connection 134 to the network device manager 160. The optical communication path can be light transmitted between the network device 110 and the proxy device 130. The light can be transmitted by an LED or a screen (e.g., a mobile device's screen). The transmitted light can be received or detected by an LED, a screen, or a camera. The transmitted light may be a flashing or blinking light.

The secure connection 134 can be a wireless connection, such as a cell phone signal or wireless intermit. For example, a mobile phone that is acting as the proxy device 130 can provide the secure connection 134 by accessing the cloud through a mobile phone plan, a cellular connection, or a wireless network.

In some embodiments, the proxy device 130 receives messages front the network device 110 and retransmits the messages to the network device manager 160, or vice versa. The proxy device 130 can receive input from a user, such as through an application running on the proxy device 130, to transmit information to the network device manager 160, such as an authentication request for a secure communication link or a request for information related to the network device 110. In some embodiments, the proxy device 130 can receive input from the user to transmit information to the network device 110, such as instructions or requests for state information of the network device 110. This state information can include operating parameters, fault or error conditions, or hardware or software settings of the network device 110.

In some embodiments, the proxy device 130 can display information to a user. This information can be data that is being passed to the network device 110 or network device manager 160, or can be data requested by or intended for the user. For example, the proxy device 130 can display state information from the network device 110, such as an error or fault state. The proxy device 130 can also display instructions or notifications from the network device manager 160 for a user of the proxy device 130. The display instructions can be part of or included with the repair instructions. These instructions can indicate to the user of the proxy device 130 an action to take, such as putting the proxy device 130 in position to establish an optical communication path to the network device 110 or replacing the network device 110 with a new network device (e.g., a newly-installed network device 110).

In some embodiments, the network device manager 160 and the proxy device 130 can be configured to establish a secure communications channel. The secure communications channel can be through the secure connection 134 and the secure connection 168. The line of sight protocol or the communication protocol of the optical communication path 132 between the network device 110 and the proxy device 130 can allow the network device manager 160 to establish the secure connection to the network device 110 via the proxy device 130. This can be a proxy communication link, where the proxy device 130 enables communication between the network device 110 and the network device manager 160.

In some embodiments, a network, such as the network 140, can be in communication with network devices 110 from more than one region. The network 140 can have multiple stock-keeping units (SKUs), such as an FCC SKU, a Canadian SKU, a European SKU, a World SKU, and the like, that encode the appropriate SKU into the proxy device 130, which enables a user to direct the proxy device 130 at a newly-installed network device 110 to inform the newly installed network device 110 regarding a relevant power table for the applicable region. By informing the newly-installed network device 110 of the relevant power table, the newly-installed network device 110 can be configured to operate using the proper signal power levels. For example, the user can install off-the-shelf network devices 110 in a network without configuring the off-the-shelf network devices 110 for the network, then use embodiments of the optical communication links described in this application to establish a secure connection through the optical communicator 120, update the power tables for the network devices 110, and configure the off-the-shelf network devices 110 to communicate in the network according to the proper network settings. This allows the network devices 110 to be configured even though they cannot directly access the network out of the box. This can also be beneficial for networks that prohibit communication with the cloud, such as the cloud 150. For networks that prohibit cloud communication, the optical communicator 120 can provide a way for the network device 110 to communicate with the network device manager 160.

In some embodiments, instead of using the optical communicator 120, acoustic sensors can be used to establish the communications link between the proxy device 130 and the network device 110. By replacing the optical communications path 132 with an acoustic communications path, the proxy communications link can be established. An acoustic sensor, such as a microphone, and an acoustic transmitter, such as a speaker, can allow the network device 110 to transmit and receive acoustic signals. Similarly, the proxy device 130 can have a speaker and a microphone for acoustic communication. A variety of communications protocols can be implemented using acoustic signals, such as Morse code and binary signaling.

Figure 2:
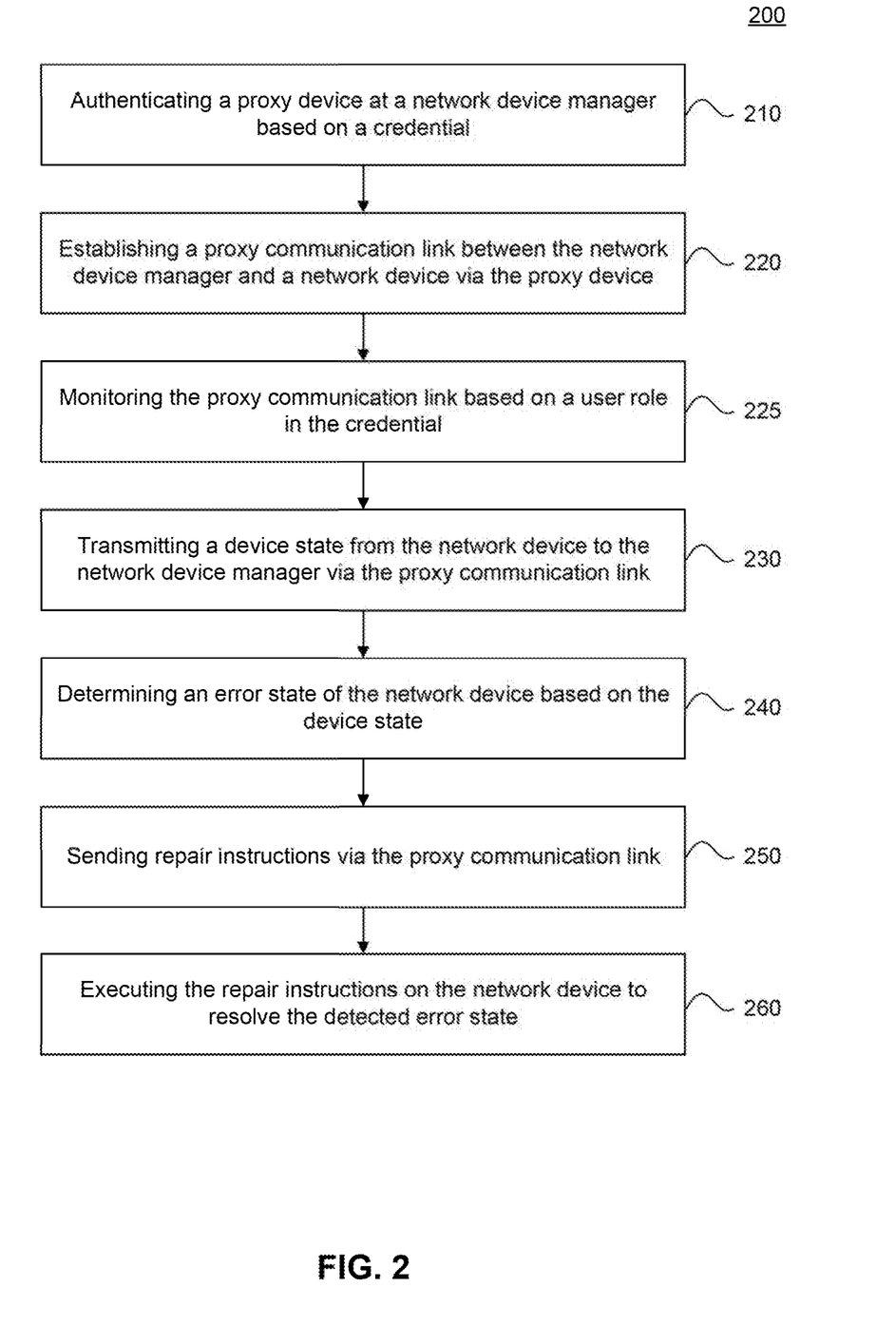
FIG. 2 is a flow chart illustrating a method for providing proxy communication between a network device and a network device manager, according to some embodiments.

FIG. 2 is a flow chart illustrating a method 200 for providing a proxy communication between a network device and a network device manager, according to some embodiments. In some embodiments, referring to the proxy communication system 100 in FIG. 1, the method 200 may allow the network device manager 160 to access the network device 110 via the proxy device 130 using the proxy communication link. The method 200 is described with respect to the proxy communication system 100. Based on the description herein, the method 200 can be applied to other communication systems, which are within the spirit and scope of the present disclosure.

Referring to FIG. 2, in 210, the proxy device 130 is authenticated at the network device manager 160 based on a credential. For example, the proxy device 130 can send an authentication request to the network device manager 160. The authentication request can include the credential. The network device manager 160 can authenticate the proxy device 130 using authentication protocols.

In some embodiments, the proxy device 130 can use a password, fingerprint, or facial recognition to receive authentication information from a user of the proxy device 130, which is then passed on to the network device manager 160 as part of the authentication request. This information can be used by the network device manager 160 to authenticate the proxy device 130.

In some embodiments, the authentication uses the information in the credential to determine a level of authentication to provide. The credential can include a user role, such as technician, administrator, or device user. The user role can limit the amount of activities the user can perform, the information which the user can access, or the length of time the user is authenticated without re-authenticating. Authenticating the proxy device can include identifying access permissions to the proxy device based on the user role in the credential.

For example, the user can be a technician who can log into the proxy device 130 using a password. The user's account includes information that indicates that the user is a technician and the proxy device 130 knows what level of access the technician has. The access can allow the user to perform certain commands or make information requests, such as requesting the device state. The access level can allow the user to view certain information on the display of the proxy device 130, as described above.

The variation of the level of access can depend on the user role. For example, a technician can be able to view state information of the network device 110 or repair instructions. An administrator can additionally be able to see device user information, such as account information. A device user may not be able to view any information on the display, but can only establish the proxy link to allow a remote administrator, technician, or other user to evaluate and interact with the network device 110. This can be advantageous for allowing a device user to establish the connection and allow a service provider to remotely investigate and repair the network device 110 without dispatching a person to the location of the network device 110, relying rather on the device user who is with the device.

The proxy device 130 can have an application running thereon which sends the authentication message. This application can manage the credential of the user and can adjust the authentication protocol based on the user role associated with the user.

In 220, a proxy communication link is established between the network device manager 160 and the network device 110 via the proxy device 130. The proxy communication link, as described above, allows the proxy device 130 to provide communication between the network device 110 and the network device manager 160. The proxy communication link can include the optical communication path 132 and the secure connections 134 and 168, according to some embodiments.

In some embodiments, the proxy communication link can only be established for the proxy device 130 after being authenticated in 210. The proxy device 130 can have software, such as an application running thereon, which is authenticated in 210 prior to the proxy device 130 establishing the communication link with the network device 110. The network device 110 can be configured to verify that the proxy device 130 has been authenticated, such as requiring a password or verification message.

In 225, the proxy communication link can be monitored based on the user role in the credential. In some embodiments, operation 225 can be performed throughout method 200, as long as the proxy device 130 is authenticated by the network device manager 160. For example, operation 225 can be performed during or after operations 230, 240, 250, and 260. In some embodiments, operation 225 is optional and can be bypassed—e.g., the method 200 can perform operation 220 followed by operation 230, thus bypassing operation 225.

In some embodiments, the network device manager 160 is configured to authenticate a proxy device 130 for limited purposes, based on the user role in the credential. For example, the network device manager 160 can monitor the proxy device 130 and limit actions based on the user role. The actions can include requesting information from the network device 110 or the network device manager 160, displaying information on the proxy device 130, or sending instructions to the network device 110 from the proxy device 130.

The network device manager 160 can be configured to terminate the authentication of the proxy device 130 after a time period exceeds a threshold. This threshold can be based on the user role. For example, a technician user role can have an associated threshold that is longer or shorter than a time period for an administrator or device user. The length of the threshold for each user role can be based on the expected tasks or access to the network. The network device manager 160 can re-authenticate the proxy device 130 after termination. Alternatively, the network device manager 160 can provide an option to re-authenticate prior to terminating the authentication. For example, the network device manager 160 can provide a prompt to the proxy device 130, in which the prompt indicates whether the proxy device 130 (e.g., via an input by a user of the proxy device 130) should request re-authentication with the network device manager 160.

In 230, a device state is transmitted from the network device 110 to the network device manager 160 via the proxy communication link. In some embodiments, the device state can be requested by the proxy device 130 or the network device manager 160. As discussed above, the device state can be received by the proxy device 130 before being retransmitted by the proxy device 130 and being ultimately received by the network device manager 160. In some embodiments, the proxy device 130 can simply forward the device state to the network device manager 160. In other embodiments, the proxy device 130 can also process the device state internally.

The device state can be displayed on a screen of the proxy device 130. The device state can be information that indicates an operational state of the network device 110, including error states in or other issues with the network device 110. In some embodiments, the device state can be stored on the network device 110 and then transmitted by the network device 110.

In some embodiments, the device state is encoded or transformed into a specific format prior to transmission. This can be due to differences in the message or compression protocols or formats between the network device 110 and the proxy device 130 versus the proxy device 130 and the network device manager 160. The proxy device 130 can process the device state to determine a subset of the device state, which is then encoded for transmission In 240, an error state of the network device 110 is determined based on the device state. The device state can include explicit information about the operational state of components in the network device 110 or performance information about how the operation of network device 110, such as power or signal levels within the network device 110.

The error state can be determined by the network device manager 160 based on the device state. The network device manager 160 can read explicit information from the device state to determine the error state or can infer or determine the error state based on a combination of information in the device state, including explicit device state information, and performance information. Explicit information can be information in the device state that specifically defines an error, such as an error flag or hardware state indicating that the network device 110 has a faulty transmitter. Inferred information can require analysis of one or more elements in the device state or the performance information. For example, the device state of the network device 110 can indicate that the transmitter is working and can indicate an output power level setting, while the performance information of the network device 110 can indicate that the network device 110 is unable to communicate with the network 140. There is no specific indicator of the error state in the device state, but the network device manager 160 can infer an error state, such as that the network device 110 is transmitting at the wrong power level.

In some embodiments, the device state can be displayed on the proxy device 130. This can allow a user of the proxy device 130 to determine the error state. An application on the proxy device 130 can be able to determine certain types of errors and display information regarding the error types and/or the device state.

In 250, repair instructions are sent via the proxy communication link. In some embodiments, the repair instructions can be sent by the network device manager 160 or the proxy device 130. The network device manager 160 or the proxy device 130 can determine the instructions based on the error state or the device state of the network device 110.

In some embodiments, the repair instructions can be code or a message configured to be run by processors 112 on the network device 110. The repair instructions can be translated into instructions for the processors 112 to execute. The repair instructions can be transmitted on the proxy communications link to the proxy device 130 and then to the network device 110. Such repair instructions can be used when the network device 110 has an error state that may be corrected by a software Or settings change.

For example, the network device 110 can have a software or settings error and the repair instructions may cause the processors 112 to fix the software issue by changing instructions stored in memory 114 or by changing a setting or device state parameter in the network device 110. The network device 110 can have a hardware issue that can be corrected by disabling a portion of the hardware or rerouting functionality to other hardware in the network device 110.

In some embodiments, the repair instructions are directions for performing physical maintenance on the network device 110. The repair instructions can be a message to be displayed on the proxy device 130 instructing the user to repair the network device 110, according to some embodiments. The instructions can be transmitted to the proxy device 130. In some embodiments, the instructions need not be sent to the network device 110.

For example, the network device 110 can need to be replaced or can need internal hardware to be replaced. In some embodiments, such errors are not be repairable by a message to the network device 110. Instead, repair instructions can be a message to notify the user of what actions to take to repair the network device 110. For example, if the network device 110 has a broken transmitter, the repair instructions can include notifying the user to replace the network device 110.

In some embodiments, operation 250 includes displaying the repair instructions on the proxy device 130. The repair instructions can be displayed through an application running on the proxy device 130.

The displayed repair instructions can be a notification to the user of what the repair instructions will do. Operation 250 can also include displaying an interface element for the user to approve the repair. Proxy device 130 can require a user input prior to forwarding the repair instructions to the network device 110.

In some embodiments, the displayed repair instructions can be the instructions notifying the user how to fix an issue with the network device 110 that is not repairable by a message to the network device 110. In response to the user acknowledgement of such instructions, the repair message can cause the proxy device 130 to display an interface requesting information from the user, such as a description of hardware used in a replacement repair operation or an acknowledgement that the repair has been completed by the user. The application on the proxy device 130 can then send this information to the network device manager 160.

In 260, the repair instructions are executed on the network device 110 to resolve the detected error state. Executing the repair instructions can involve updating firmware or software on the network device 110. The repair instructions can change settings or instruct the network device 110 to reboot.

In some embodiments, the repair instructions are instructions that can require a transformation to allow the network device 110 to execute them. For example, the repair instructions can be encoded, such as in Morse code or binary signaling. Transforming the repair instructions can involve decoding or translating the repair instructions into code that can be executed by the network device 110. The network device 110 can have instructions already stored on memory 114, and the repair instructions can command the network device 110 to execute one or more of those instructions using the processors 112 to repair the network device 110.

Figure 3:
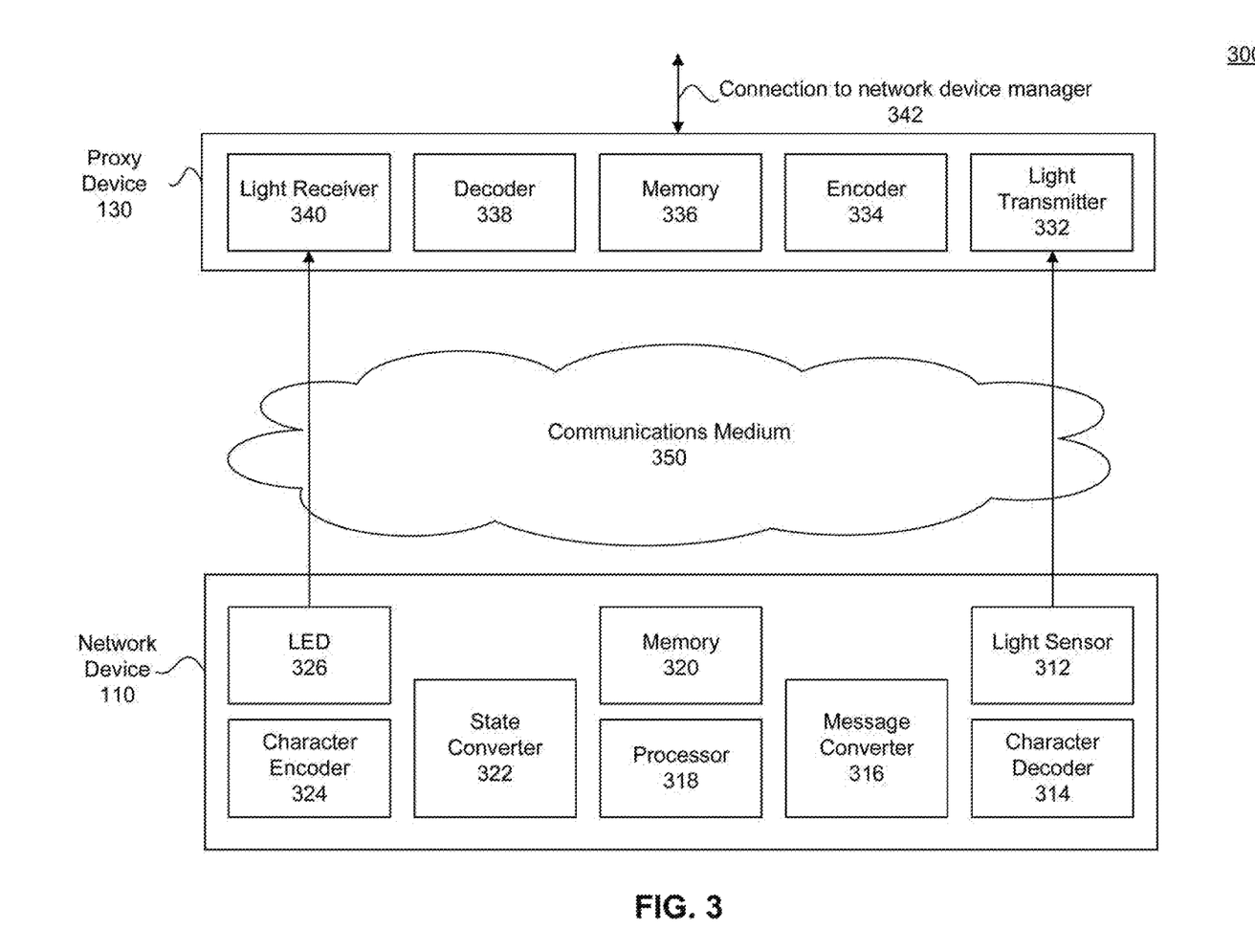
FIG. 3 illustrates a block diagram for an optical communication system between a network device and a proxy device, according to some embodiments.

FIG. 3 illustrates a block diagram for an optical communication system 300 between the network device 110 and the proxy device 130, according to some embodiments. The network device 110 can communicate with the proxy device 130, and vice versa, through communication medium 350. The communication medium 350 can be air or another medium suitable for optical communication, such as optical communication using LEDs.

In some embodiments, the network device 110 can include a light sensor 312, a character decoder 314, a message converter 316, a processor 318, a memory 320, a state converter 322, a character encoder 324, and an LED 326. The character decoder 314, the message converter 316, the processor 318, the memory 320, the state converter 322, and the character encoder 324 can be implemented in hardware and/or software in the network device 110, including in the processors 318 and memory 320, or they can be part of the optical communicator 120. The light sensor 312 and the LED 326 can be part of the optical communicator 120 and is configured to sense light signals. In some embodiments, the LED 326 also functions as the light sensor 312.

The memory 320 can include instructions that can be executed by the processor 318 to operate the optical communication system 300. The instructions can include generating a message and transmitting the message via LED 326 to the proxy device 130. The instructions can also include receiving the message at the light sensor 312 and providing it to the processor 318 for execution and/or analysis.

In some embodiments, the messages transmitted and received by the network device 110 can be transmitted by use of optical signaling, such as Morse code or binary signaling. Processor 318 can provide information to the state converter 322, which converts the information into a message, such as a device state message. The character encoder 324 can convert the message into a format suitable for transmission by the LED 326, including Morse code symbols, binary symbols, or other symbolic representations suitable for optical communication.

For received messages, the light sensor 312 can pass received Morse code symbols, binary symbols, or other symbolic representations to character decoder 314, which coverts these symbols into a message. The message converter 316 can convert the message into instructions, such as computer instructions for repairing the network device 110. The processor 112 can then execute these instructions.

In some embodiments, the proxy device 130 can include a light transmitter 332, an encoder 334, a memory 336, a decoder 338, and a light receiver 340. The proxy device 130 can be connected to the network device manager 160 (not shown) via a connection to network device manager 342, which can be the secure connections 134 and 168 through cloud 150 depicted in FIG. 1.

Proxy device 130 can receive the messages through the connection to network device manager 342 or generate the messages based on user input. The proxy device 130 can receive messages from the network device 110 via the light receiver 340.

In some embodiments, the messages transmitted and received by the proxy device 130 can be transmitted by use of optical signaling, such as Morse code or binary signaling. The encoder 334 can be configured to encode messages into the optical signaling format for transmission. The decoder 338 can be configured to decode messages received by the light receiver 340 from the network device 110 in the optical signaling format.

In some embodiments, the memory 320 can store region specific information for operating the network device 110 in conformity with local laws and rules, such as power tables for transmission levels of wireless signals, optical signals, or both.

In some embodiments, the memory 336 stores a table of stock-keeping units (SKUs) that describes models of network devices 110 that can be used in the proxy communication system 100 of FIG. 1. The proxy device 130 can add information about a desired SKU from the table of SKUs to a message to the network device 110 to instruct the network device 110 to select a specific power table from memory 320.

Figure 4:
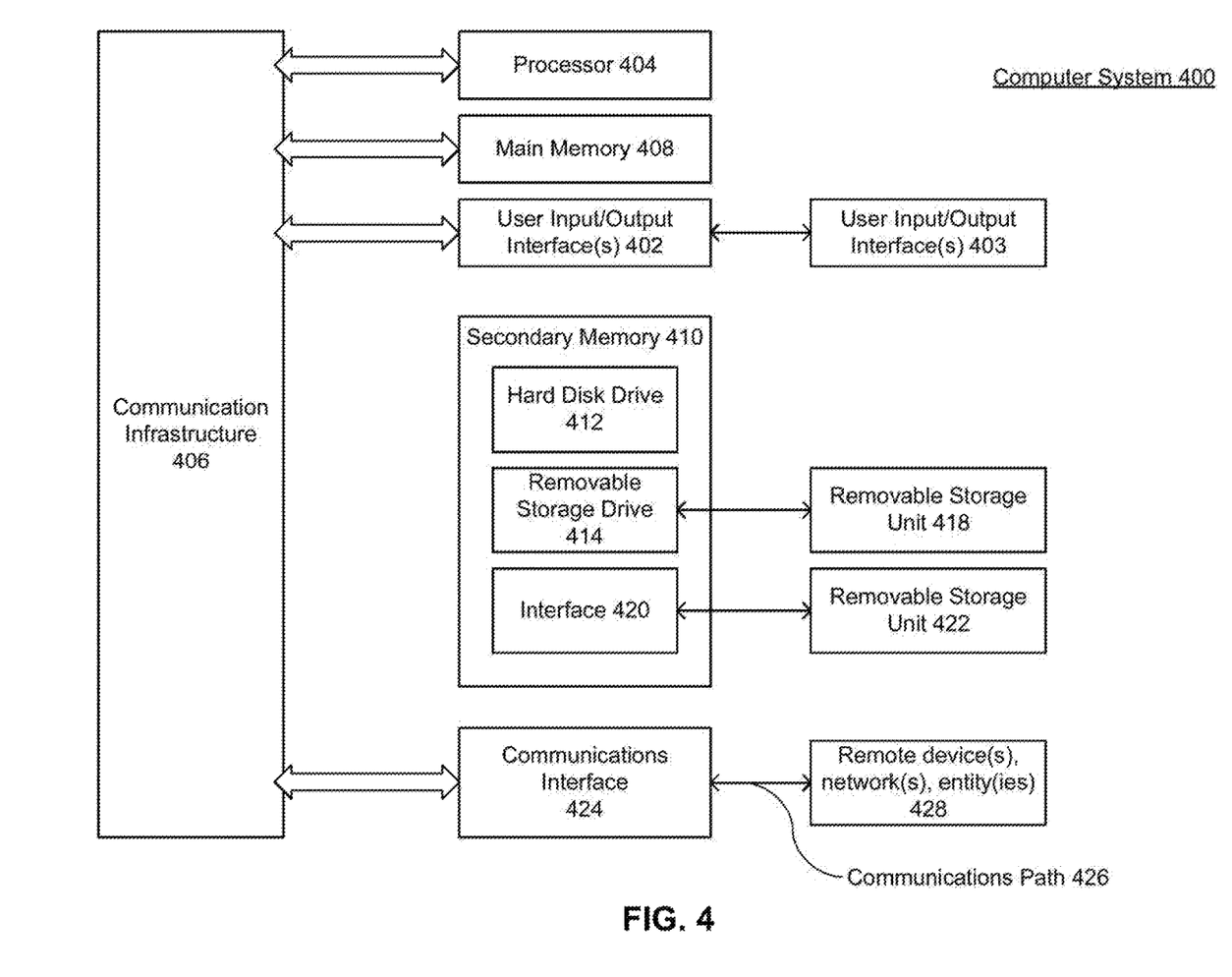
FIG. 4 illustrates a block diagram of a general-purpose computer that may be used to perform various aspects of the present disclosure, according to some embodiments.

Various embodiments can be implemented, for example, using one or more computer systems, such as computer system 400 shown in FIG. 4. One or more computer systems 400 can be used, for example, to implement any of the embodiments discussed herein, as well as combinations and sub-combinations thereof. For example, one or more computer systems can implement the operations of method 200.

Computer system 400 can include one or more processors (also called central processing units, or CPUs), such as a processor 404. Processor 404 can be connected to a bus or communication infrastructure 406.

Computer system 400 may also include user input/output device(s) 403, such as monitors, keyboards, pointing devices, etc., which may communicate with communication infrastructure 406 through user input/output interface(s) 402.

One or more of processors 404 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPU), the GPU can be particularly useful in at least the image recognition and machine learning aspects described herein.

Additionally, one or more of processors 404 can include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 400 can also include a main or primary memory 408, such as random access memory (RAM). Main memory 408 can include one or more levels of cache. Main memory 408 can have stored therein control logic (i.e., computer software) and/or data.

Computer system 400 can also include one or more secondary storage devices or secondary memory 410. Secondary memory 410 can include, for example, a main storage drive 412 ands/or a removable storage device or drive 414. Main storage drive 412 can be a hard disk drive or solid-state drive, for example. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 can include a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 can read from and/or write to removable storage unit 418.

Secondary memory 410 can include other means, devices, components, instrumentalities or other approaches for allowing computer programs and/or other instructions and/or data to be accessed by computer system 400. Such means, devices, components, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 can enable computer system 400 to communicate and interact with any combination of external devices, external networks, external entities, etc. (individually and collectively referenced by reference number 428). For example, communication interface 424 can allow computer system 400 to communicate with external or remote devices 428 over communication path 426, which can be wired and/or wireless (or a combination thereof), and which can include any combination of LANs, WANs the Internet, etc. Control logic and/or data can be transmitted to and from computer system 400 via communication path 426.

Computer system 400 can also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein can be implemented as a method, process, apparatus, system, or article of manufacture such as a non-transitory computer-readable medium or device. For illustration purposes, the present framework can be described in the context of distributed ledgers being publicly available, or at least available to untrusted third parties. One example as a modern use case is with blockchain-based systems. It should be appreciated, however, that the present framework can also be applied in other settings where sensitive or confidential information needs to pass by or through hands of untrusted third parties, and that this technology is in no way limited to distributed ledgers or blockchain uses.

Computer system 400 can be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (Baas), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas can be used, either exclusively or in combination with known or open standards.

Any pertinent data, files, and/or databases can be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers can employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection can also make use of uniform resource identifiers (URI), which can further include uniform resource locators (URL) or uniform resource names (URN). Other forms of uniform and/or unique identifiers, locators, or names can be used, either exclusively or in combination with forms such as those set forth above.

Any of the above protocols or APIs can interface with or be implemented in any programming language, procedural, functional, or object-oriented, and can be compiled or interpreted. Non-limiting examples include C, C++, C#, Objective-C, Java, Scala, Clojure, Elixir, Swill, Go, Perl, PHP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenU15, AngularJS, Express.js, Backbone.js, Ember.js, DHTMLX, Vue, React, Electron, and so on, among many other non-limiting examples.

In some embodiments, a tangible, non transitory apparatus or article of manufacture comprising a tangible, non-transitory computer useable or readable medium having control logic (software) stored thereon can also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

Based on the teachings contained in this disclosure, it will be apparent to persons skilled in the relevant art(s) how to make and use embodiments of this disclosure using data processing devices, computer systems and/or computer architectures other than those expressly shown in the figures. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for repairing a network device using a proxy communication link between the network device and a network device manager, comprising:
   authenticating, by the network device manager, a proxy device by verifying a credential of the proxy device to establish a secure connection between the network device manager and the proxy device;
   receiving, by the network device manager, a device state of the network device through the proxy device and via the proxy communication link, wherein the proxy communication link comprises a wireless optical communication link or an acoustic communication link established between the proxy device and the network device;
   determining, by the network device manager, repair instructions for the network device based on the device state;
   transmitting, by the network device manager and through the proxy device, the repair instructions to the network device;
   monitoring the proxy communication link based on a user role in the credential as long as the proxy device is authenticated;
   monitoring a length of time that the proxy device has been in communication with the network device;
   in response to the length of time being greater than a threshold, terminating the secure connection and the proxy communication link; and
   providing an option to the proxy device for re-authentication prior to terminating the secure connection and the proxy communication link.

2. The method of claim 1, wherein authenticating the proxy device to establish the secure connection comprises identifying access permissions for the proxy device based on a user role in the credential.

3. The method of claim 1, wherein the threshold is set based on the user role.

4. The method of claim 1, wherein the proxy communication link comprises the secure connection and the wireless optical communication link or the acoustic communication link.

5. The method of claim 1, wherein:
the proxy device comprises a mobile device comprising a screen and a camera for establishing the wireless optical communication link with the network device,
the camera is configured to receive, from the network device, the device state of the network device,
the screen is configured to transmit the repair instructions to the network device, and
the wireless optical communication link uses a flashing light based on Morse code or a binary signaling.

6. The method of claim 1, wherein transmitting the repair instructions comprises transmitting repair instructions that update the device state of the network device.

7. The method of claim 1, wherein transmitting the repair instructions comprises transmitting a message for display on the proxy device.

8. A network device, comprising:
a processor;
a memory in communication with the processor and comprising state information and instructions; and
an optical communication element in communication with the processor and memory;
wherein the instructions, when executed by the processor, are configured to:
cause the optical communication element to provide a wireless optical communication link to a proxy device, wherein the wireless optical communication link is part of a proxy communication link between the network device and a network device manager;
in response to a request for a device state, transmit the device state through the wireless optical communication link; and
receive, through the wireless optical communication link and through the proxy device, repair instructions based on the device state, the repair instructions configured to cause the processor to correct an error state in the network device by modifying the device state, the instructions, or both,
wherein the proxy communication link is monitored based on a user role in a credential as long as the proxy device is authenticated,
wherein a length of time that the network device has been in communication with the proxy device is monitored,
wherein the proxy communication link is terminated in response to the length of time being greater than a threshold, and
wherein an option is provided to the proxy device for re-authentication prior to terminating a secure connection and the proxy communication link.

9. The network device of claim 8, wherein the optical communication element comprises a light-emitting diode (LED).

10. The network device of claim 8, wherein the instructions are further configured to cause the optical communication element to flash based on Morse code or a binary signaling.

11. The network device of claim 8, wherein the network device comprises a router, a switch, an access point, a wireless gateway, a repeater, or a combination thereof.

12. The network device of claim 8, further comprising:
a network interface communicatively coupled to the processor, the memory, and the optical communication element, wherein the instructions are further configured to cause the network interface to communicate with the network device manager.

13. The network device of claim 12, wherein the instructions are further configured to cause the network interface to provide network services for devices communicatively connected to the network device.

14. The network device of claim 12, wherein the instructions are further configured to cause the network interface to communicate with the network device manager through the proxy communication link to the proxy device.

15. A non-transitory computer readable storage medium having computer readable code thereon, the non-transitory computer readable storage medium including instructions configured to cause a computer system to perform operations, comprising:
establishing a proxy communication link with a network device manager via an authenticated proxy device, wherein the proxy communication link comprises a wireless optical communication link with the authenticated proxy device and a secure connection between the authenticated proxy device and the network device manager;
transmitting a device state to the network device manager via the proxy communication link;
receiving repair instructions from the network device manager via the proxy communication link, wherein the repair instructions are based on the device state; and
executing the repair instructions,
wherein the proxy communication link is monitored based on a user role in a credential as long as the proxy device is authenticated,
wherein a length of time that a network device has been in communication with the authenticated proxy device is monitored,
wherein the proxy communication link is terminated in response to the length of time being greater than a threshold, and
wherein an option is provided to the proxy device for re-authentication prior to terminating the secure connection and the proxy communication link.

16. The non-transitory computer readable storage medium of claim 15, wherein establishing the proxy communication link comprises establishing the wireless optical communication link with the authenticated proxy device.

17. The non-transitory computer readable storage medium of claim 16, wherein establishing the wireless optical communication link comprises sensing a flashing light source based on Morse code or a binary signaling.

18. The non-transitory computer readable storage medium of claim 15, wherein executing the repair instructions comprises updating the device state.

19. The non-transitory computer readable storage medium of claim 15, wherein the computer readable code is configured to be provided to and executed by a network device to update the network device to operate according to the instructions.

20. The non-transitory computer readable storage medium of claim 15, wherein receiving the repair instructions comprises receiving a message for display.

* * * * *

UNITED STATES PATENT AND TRADEMARK OFFICE
CERTIFICATE OF CORRECTION

PATENT NO. : 11,792,288 B2
APPLICATION NO. : 17/014658
DATED : October 17, 2023
INVENTOR(S) : Vucajnk et al.

It is certified that error appears in the above-identified patent and that said Letters Patent is hereby corrected as shown below:

In the Specification

In Column 3, Line 21, delete "130." and insert -- 110. --, therefor.

In Column 4, Line 3, delete "180" and insert -- 160 --, therefor.

In Column 6, Line 10, delete "intermit." and insert -- internet. --, therefor.

In Column 6, Line 16, delete "front" and insert -- from --, therefor.

In Column 10, Line 28, delete "Or" and insert -- or --, therefor.

In Column 13, Line 17, delete "ands/or" and insert -- and/or --, therefor.

In Column 13, Line 56, delete "WANs" and insert -- WANs, --, therefor.

Signed and Sealed this
Twenty-eighth Day of November, 2023

Katherine Kelly Vidal
*Director of the United States Patent and Trademark Office*